United States Patent [19]

Okuda

[11] Patent Number: 5,538,369
[45] Date of Patent: Jul. 23, 1996

[54] MACHINE TOOL WITH TAPPING FUNCTION

[75] Inventor: Shinji Okuda, Minamitsuru-gun, Japan

[73] Assignee: Fanuc Ltd., Yamanashi, Japan

[21] Appl. No.: 389,160

[22] Filed: Feb. 15, 1995

[30] Foreign Application Priority Data

Feb. 17, 1994 [JP] Japan .................................. 6-041728

[51] Int. Cl.$^6$ ..................................................... B23G 1/18
[52] U.S. Cl. .................. 408/3; 364/474.02; 364/474.12; 408/10; 470/96
[58] Field of Search ................................ 408/3, 10, 129; 470/96; 364/474.02, 474.12, 474.22

[56] References Cited

U.S. PATENT DOCUMENTS

| | | |
|---|---|---|
| 4,692,071 | 9/1987 | Hirota ........................................ 408/10 |
| 5,062,744 | 11/1991 | Nakamura et al. ................. 364/474.02 |

FOREIGN PATENT DOCUMENTS

| | | | |
|---|---|---|---|
| 96750 | 6/1982 | Japan ......................................... 408/3 |
| 4-93114 | 3/1992 | Japan . | |

*Primary Examiner*—Daniel W. Howell
*Attorney, Agent, or Firm*—Staas & Halsey

[57] ABSTRACT

In a machine tool equipped with a numerical control unit for digitally controlling a spindle motor, the number of revolutions and feed speed of a spindle for rigid tapping are obtained by designating the number of revolutions and the tapping pitch from an input device and calculating the feed speed of the spindle by an arithmetic device based on the designated number of revolutions and tapping pitch. Alternatively, they are obtained by designating the tapping pitch from the input device, changing the number of revolutions by a number-of-revolutions changing device and calculating the feed speed of the spindle by the arithmetic device based on the designated pitch and the changed number of revolutions. The numerical control unit controls the number of rotations of the spindle motor based on the obtained number of revolutions and also controls the axial feed of the spindle based on the obtained feed speed, thus synchronizing the number of revolutions of the tap with the feed speed of the tap with respect to the work during the tapping operation.

2 Claims, 4 Drawing Sheets

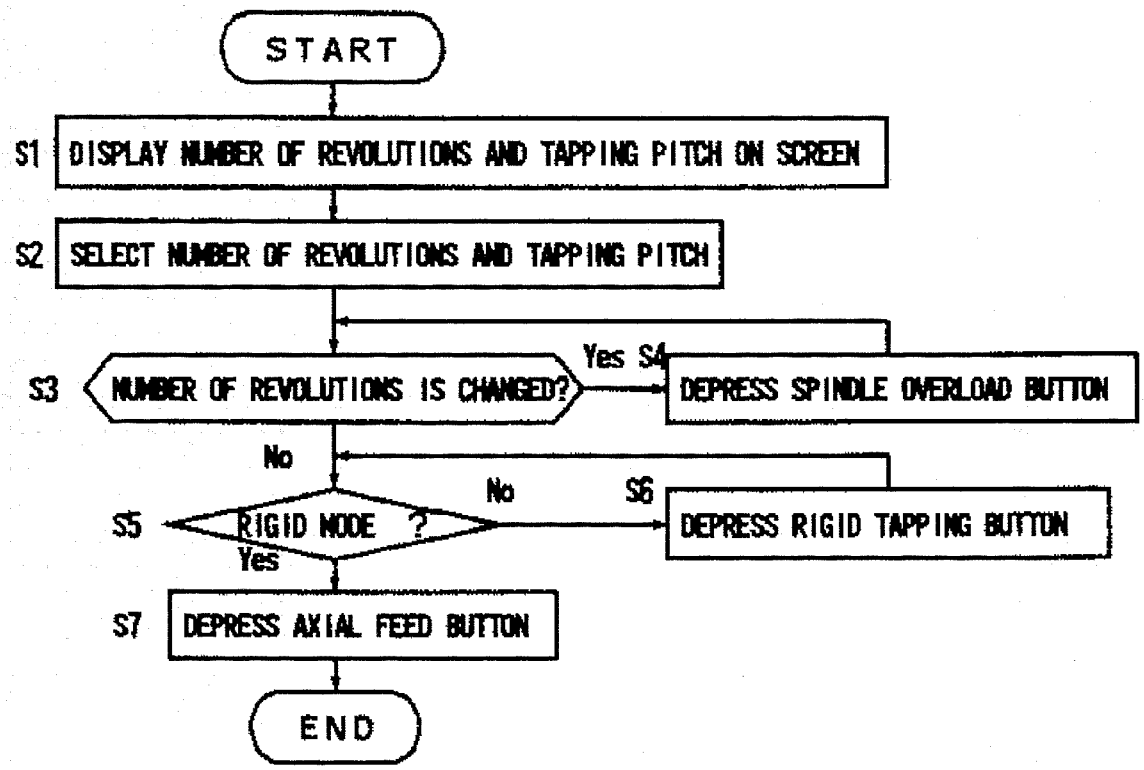
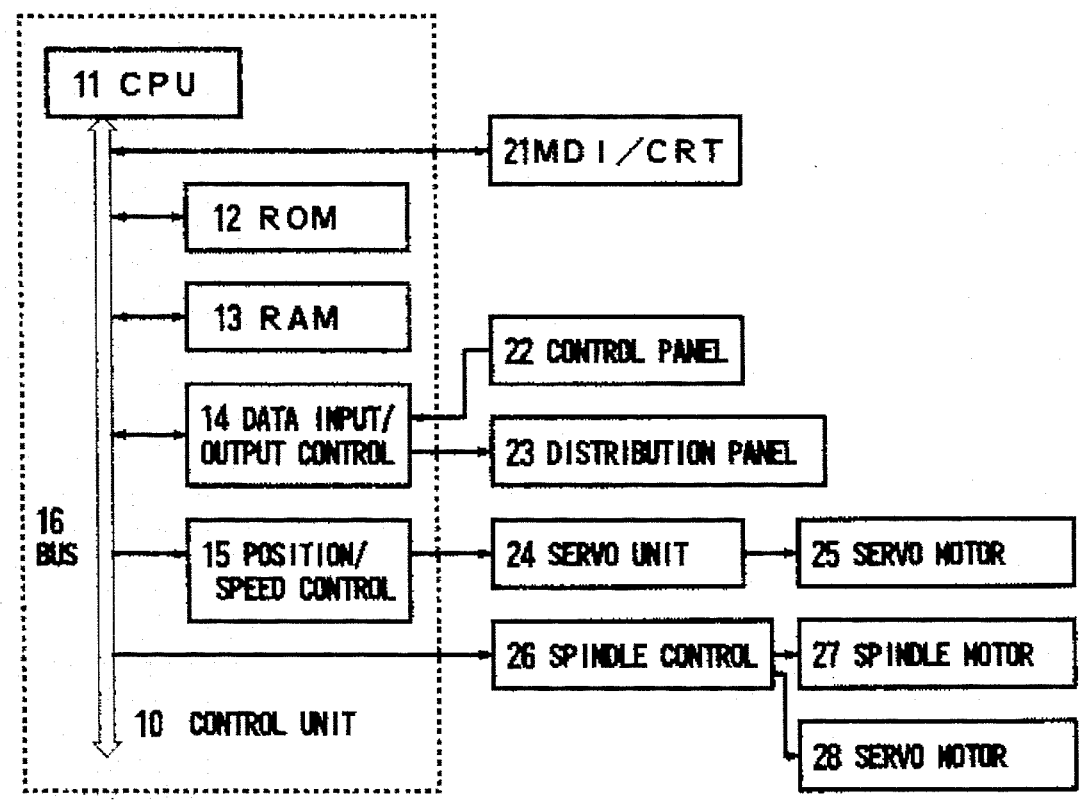
FIG. 2

MACHINE TOOL WITH TAPPING FUNCTION

BACKGROUND OF THE INVENTION

1. Field of the Invention

This invention relates to a machine tool with a tapping function.

2. Description of the Related Art

In giving a work various machining operations, it is currently known that threading is performed while the work is fixed. Conventionally, in performing threading on one end of the fixed work, a tapping operating using an attachment called "a tapper" and a rigid-type tapping operation, in which the amount of revolution (the number of revolutions) of a tap and the amount of axial feed (the feed speed) of the tap are synchronous with each other, are known. In the rigid-type tapping operation, tapping is thus performed with a mutual relationship between the number of revolutions of the tap and the axial position of the tap.

If the tap is to be moved axially while the spindle to which the tap is attached is rotated with respect to a fixed work, the tap is rotated, at a cutting speed designated for the work, due to the rotation of the spindle, so that the main spindle is moved axially so as to provide a designated pitch of tapping on the end surface of the work. In this case, the cutting speed of the tap with respect to the work is the rotating speed of the spindle.

After a thread has been cut to the bottom of the thread, the spindle is rotated in the reverse direction. The feed speed of the spindle in this reverse rotation is determined by the rotating speed and tapping pitch of the spindle, and the direction of feed is opposite to that of the previous rotation. As a result, the tap is retracted along the threaded surface to remove from the work, completing the rigid-type tapping operation, In this conventional rigid-type tapping, a program to execute the tapping is created, and a numerical control of a numerically controlled machine tool is controlled by this program. Following is an example of control program to be used in the rigid-type tapping operation in which a tap having a diameter of 6 mm and a tapping pitch of 1.0 mm is formed on a fixed work by a tap rotating at 1,000 r.p.m.

M29 S1000;

G84 Z**, * F1000;

G80;

In this control program, the rigid tap mode is determined by the first code "M29" in "M29 S1000" of the first line, and the rotating speed of the spindle, which is the cutting speed of the tap, is set up to 1,000 r.p.m. by the next code "S1000". Then, the tapping operation is performed at a fixed cycle in a tapping cycle by the first code "G84" in "G84 Z**, * F1000" of the second line. The amount of feed in the direction of Z axis, which is the length of the thread to be cut, is determined by the second code "Z**, *", and the extent of axial feed of the tap is determined by "F1000". Then, the fixed cycle in the tapping cycle is canceled by the code "G80" of the third line to terminate the tapping operation.

Therefore, in the conventional rigid-type tapping operation, it is necessary to create a program which is composed of at least three lines for one threading operation. In creating this program, it is necessary that the feed speed F is obtained from the cutting conditions, i.e. the pitch P and the number of revolutions S, and is then set in the program.

Furthermore, in changing the cutting conditions, it is necessary that the feed speed F is obtained according to the change of the number of revolutions S, and is then set in the program, even if there is no change in the pitch P.

For example, if the pitch P is 1.0 and the number of revolutions S is 1,000 r.p.m., the feed speed F1000 is obtained by the calculation 1.0×1,000=1,000 and is then set in the program. At that time, if the number of revolutions S is changed to 1,500, the feed speed F1500 is obtained by the calculation 1.0×1,500=1,500 and is then set in the program.

Thus for the conventional rigid-type tapping operation, a program for the operation must be created. And in order to change the cutting conditions, it is necessary to calculate a set value based on the cutting conditions and to change the program by the set value.

In Japanese Non-examined Patent Publication No. 4-93114, there is disclosed a tapping machine for changing a number of revolution in accordance with a parameter stored in a memory.

SUMMARY OF THE INVENTION

It is an object of this invention to provide a machine tool having a rigid-type tapping function which does not require any program for tapping.

Another object of the invention is to provide a machine tool having a rigid-type tapping function for which it is unnecessary to set the feed speed due to the change of the cutting conditions.

According to a first aspect of the invention, there is provided a machine tool having a tapping function which does not require any program for tapping equipped with a numerical control unit for digitally controlling a motor for a spindle, comprising: input means for designating a revolving speed and a tapping pitch for the spindle; arithmetic means for calculating a feed speed of the spindle based on said designated revolving speed and tapping pitch; and said numerical control unit being operable to perform a tapping operation by controlling the rotating speed of the motor based on said designated revolving speed and also by controlling the axial movement of the spindle based on said designated tapping pitch.

With the tapping function which does not require any program for tapping of the first arrangement, the number of revolutions and feed speed of the spindle for the rigid-type tapping can be obtained by designating the number of revolutions and tapping pitch from the input device and by calculating the feed speed of the spindle, based on the designated numbers of revolutions and tapping pitch, by the arithmetic device. The numeric control controls the number of rotations of the motor for the spindle, based on the obtained number of revolutions, and also controls the axial feed of the spindle, based on the obtained feed speed, so that the number of revolutions and feed speed of the tap with respect to the work are synchronized with each other to perform the tapping operation.

According to a second aspect of the invention, there is provided a machine tool equipped with a numerical control unit for digitally controlling a motor for a spindle, comprising: input means for designating a tapping pitch for the spindle; revolving speed changing means for changing a revolving speed for the spindle; arithmetic means for calculating a feed speed of the spindle based on said designated tapping pitch and said changed revolving speed; and said numerical control unit being operable to perform a tapping operation by controlling the rotating speed of the motor based on said changed revolving speed and also by controlling the axial movement of the spindle based on said calculated feed speed, so that the tapping function which does not require re-designation of feed speed.

With the tapping function which does not require re-designation of feed speed of the second arrangement, in a machine tool equipped with a numerical control unit for digitally controlling a motor for a spindle, the number of revolutions and feed speed of the spindle for the rigid-type tapping operation can be obtained by designating the tapping pitch from the input device, by changing the number of revolutions by the number-of-revolutions changing device and by calculating the feed speed of the spindle, based on the designated tapping pitch and the changed number of revolutions, by the arithmetic device. The numeric control controls the number of rotations of the motor for the spindle, based on the obtained number of revolutions, and also controls the axial feed of the spindle, based on the obtained feed speed, so that the number of revolutions and feed speed of the tap with respect to the work are synchronized with each other to perform the tapping operation.

BRIEF DESCRIPTION OF THE DRAWINGS

FIG. 1 is a flowchart showing the tapping procedure of a machine tool according to this invention;

FIG. 2 is a block diagram showing a control unit of a numerically controlled machine tool;

DETAILED DESCRIPTION OF THE PREFERRED EMBODIMENT

Figure 4:
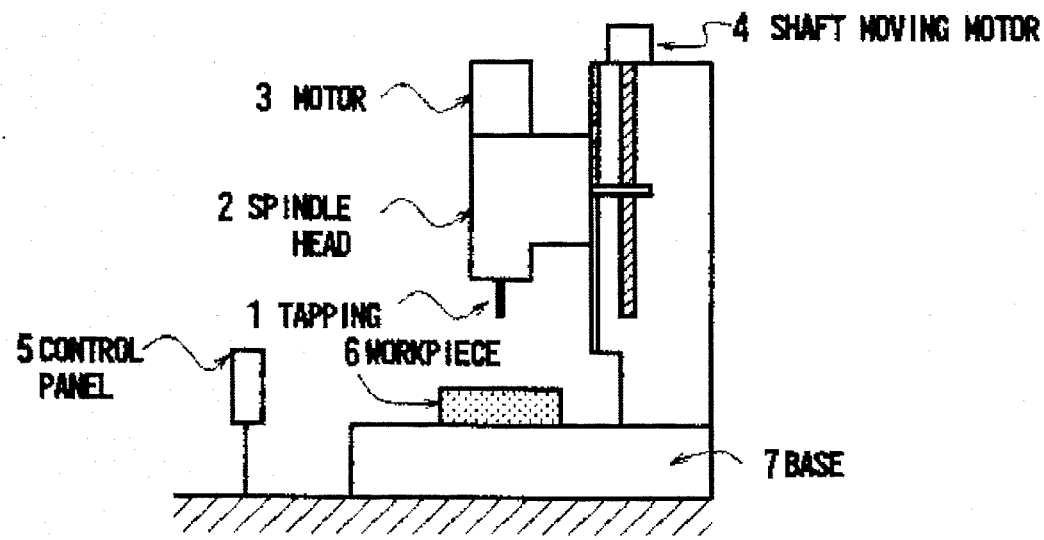
FIG. 4 is a diagram showing a control unit of a numerically controlled machine tool according to one embodiment.

A numerically controlled machine tool according to one embodiment of this invention will now be described with reference to the accompanying drawings. FIG. 4 is a block diagram showing a numerically controlled machine tool (hereinafter called "the NC machine tool") according to one embodiment.

The NC machine tool of FIG. 4 has a structure to be used in, for example, a drilling machine. In FIG. 4, a work 6 is machined by a tool device attached to the distal end of a spindle head 2. The tool device is a tap 1 in the case of the tapping operation. Mounted on the top of the spindle head 2 is a motor 3 such as a spindle motor and a servo motor. The spindle head 2 including this tap 1 is movable vertically with respect to a base 7 holding the work 6 as this movement is made by a servo motor 4 for axial movement.

These motors 3, 4 are controlled by control signals from a control panel 5.

A control unit for controlling the NC machine tool will now be described using FIG. 2. FIG. 2 is a block diagram showing a control unit of a numerically controlled machine tool.

In FIG. 2, a block surrounded by dotted lines is a control unit 10. A control signal from the control unit 10 controls the motors of the NC machine tool.

The control unit 10 includes a CPU 11 for controlling various blocks which are interconnected via a bus 16. In the machine tool of this invention, the CPU 11 has, in addition to the function of controlling the individual blocks, an arithmetic function of calculating, using the input the number of revolutions S and tapping pitch P, the speed F of axial feed of the spindle to move the tap.

In the control unit 10, the blocks to be interconnected via the bus 16 are exemplified by a ROM 12 in which a control program for NC machine tool is stored, a RAM 13 in which a machining program and various compensation data as well as set-up data are stored, a data input/output control block 14, which has a receiver for reading the states of a limit switch on the machine tool side and a switch on the control panel and a driver circuit for controlling the switching of a relay of a heavy electrical circuit and the flashing of a lamp, and a position/speed control section 15 for controlling the position of the spindle by outputting a speed command such that a position command to be given from the CPU 11 coincides with the spindle position to be detected by a feedback pulse from a detector and for controlling the feed speed, using a speed feedback signal from the detector, in such a manner the rotating speed of the motor is equal to a speed command value.

The blocks situated outside the control unit 10 and interconnected via the bus 16 and the blocks are exemplified by an MDI/CRT 21 for display and manual data input, a control panel 22, a switch panel 23, a servo unit 24 for controlling the servo motor 25, and a spindle control section 26 for controlling a motor for the spindle. The motor for the spindle may be a spindle motor 27 and a servo motor 28.

In an MDI/CRT 21, CRT represents a display device. Alternatively the display device may be any other form such as a liquid crystal display (LCD).

Figure 3:
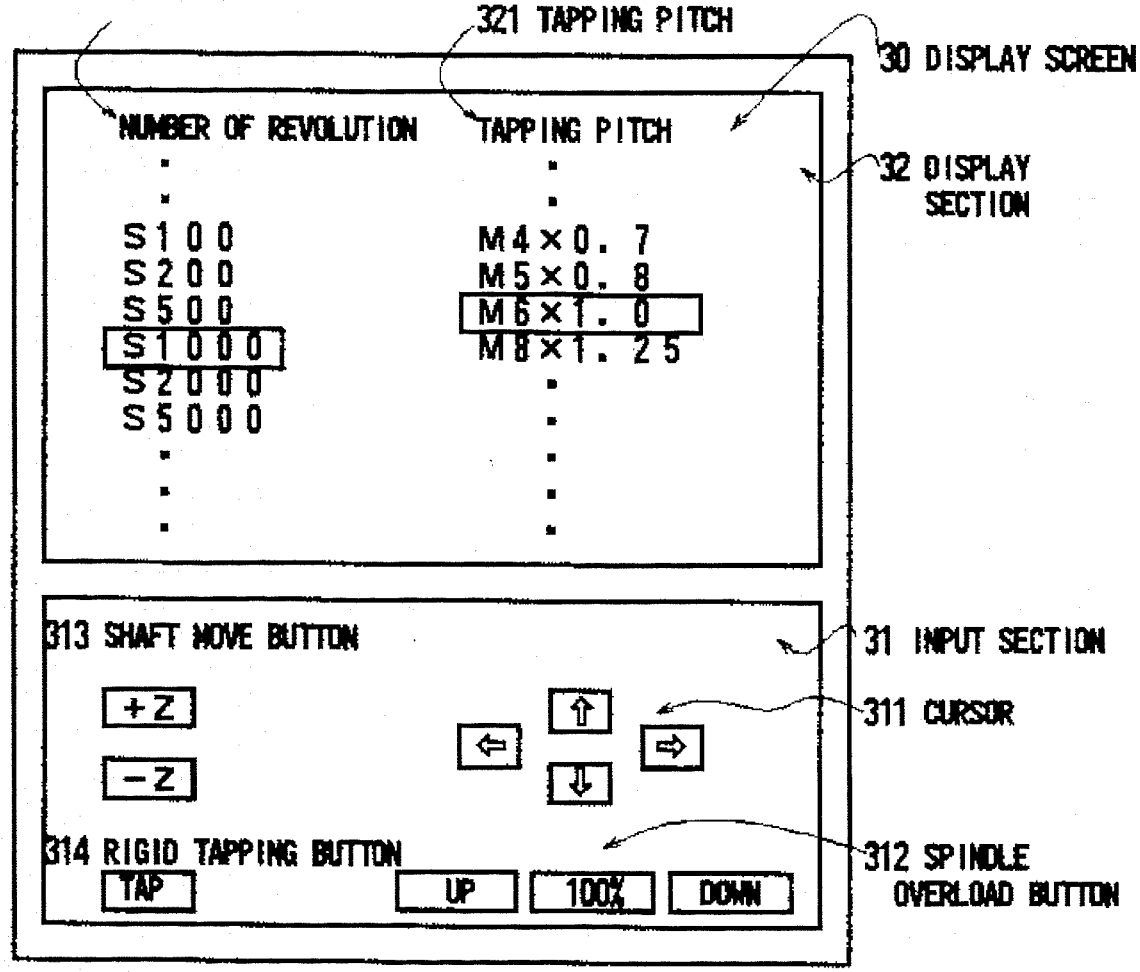
FIG. 3 is a diagram showing one embodiment of display and input portions to be used in the machine tool of the invention.

One example of the display screen of MDI/CRT to be used in the machine tool of this invention will now be described. FIG. 3 shows display and input sections of the machine tool.

In FIG. 3, the display screen 30 of the MDI/CRT has an input section 31 and a display section 32. In the input section 31 various kinds of input set-up buttons 311–314 are arranged, and in the display section 32 the tapping conditions are to be displayed.

First of all, the display section 32 will be described. The tapping conditions to be displayed in the display section 32 are exemplified by the number of revolutions of the spindle and tapping pitch. The number of revolutions of the spindle is the amount of rotation of the tap to be rotated and represents the cutting speed with respect to a work in a tapping operation. In FIG. 3, the number of revolutions is represented by S***, e.g. S100, S200, S1000, S2000 and S5000, in a number-of-revolutions display 322. S100, S200, S1000, S2000 and S5000 indicate 100 r.p.m., 200 r.p.m., 1,000 r.p.m., 2,000 r.p.m. and 5,000 r.p.m., respectively, of the spindle. The currently setup number of revolutions of the spindle is indicated by surrounded by a rectangle. Alternatively the number of revolutions may be indicated by underlining, flashing or coloring.

Another tapping condition is a tapping pitch width. The tapping pitch width is represented by M*x***, e.g. M4×0.7, M5×0.8, M6×1.0, MS×1.25 in FIG. 3 by a tapping pitch display 321. M4×0.7, M5×0.8, M6×1.0 and MS×1.25 indicate 4 mm in diameter and 0.7 in pitch, 5 mm in diameter and 0.8 in pitch, 6 mm in diameter and 1.0 in pitch, and 8 mm in diameter and 1.25 in pitch, respectively. The currently setup tapping diameter and pitch are displayed by surrounding by a rectangle. Alternatively the tapping diameter and pitch may be indicated by underlining, flashing or coloring. The combination of tapping diameter and pitch should by no means be limited to these illustrated examples.

The input section 31 will now be described. The input section 31 comprises a cursor 311 and various kinds of input set-up buttons such as spindle overload buttons 312, a spindle feed button 313 and a rigid tapping button 314.

The tapping pitch display 321 and the number-of-revolutions display 322 may be previous stored in the ROM 12 so that they can be read from the ROM 12 and displayed on the display screen of the MDI/CRT 21 based on commands of CPU 11.

The preset number of revolutions S and pitch P as well as their respective initial values may be previously stored in a memory such as RAM 13.

In FIG. 3, the cursor 311 is composed of arrow buttons for designating upward, downward, leftward and rightward directions, for example. If the leftward button or rightward button of the cursor 311 is depressed, the rectangle is moved in the leftward or rightward direction in FIG. 3 to select the number-of-revolutions display 322 or the tapping pitch display 321. If the up button or down button of the cursor 311 is depressed, the rectangle is moved in the upward or downward direction in the selected number-of-revolutions display 322 or tapping pitch display 321 to select a value of the number of revolutions S*** or the tapping pitch M*x***.

The spindle overload buttons 312 of the input section 31 are buttons for changing the number of revolutions of the spindle by increasing and decreasing the number of revolutions from the number of revolutions S selected by the cursor 311. For example, the illustrated spindle overload buttons 312 are composed a 100% button, an up button and a down button. The 100% button determines the number of revolutions S selected by the cursor 311, the up button increases the number of revolutions S, and the up button decreases the number of revolutions S.

Further, the spindle overload buttons 312 of the input section 31 includes for moving the spindle axially, having a +Z button and −Z button. The +Z button outputs a command to raise the spindle, and the −Z button outputs a command to lower the spindle.

Still further, the rigid tapping button 314 of the input section 31 is a button for changing the operating mode of the machine tool into the rigid mode. By switching on and off the rigid tapping button, it is possible to set and release, respectively, the rigid mode of the machine tool.

In the rigid-type tapping, it is necessary to synchronize the amount of rotation (the number of rotations) of the tap with the extent of axial feed (feed speed) of the tap. Generally, between the number of rotations S and feed speed F of the tap, there is the following relation:

Feed speed $F = $ tap's number of rotations $S \times $ tap's tapping pitch P, where the tapping pitch is P.

In the tapping operation of the machine tool of this invention, the feed speed F is obtained by calculation from input values of the number of rotations S and the tapping pitch P, without inputting the value of the feed speed F. This synchronizes the amount of rotations (number of rotations) of the tap with the extend of axial feed (feed speed) of the tap. Consequently, the input block 31 in the display screen shown in FIG. 3 has no input section for inputting the feed speed F.

The operation of this machine tool will now be described using FIGS. 1 through 4. FIG. 1 is a flowchart showing the tapping procedure of the machine tool. The flowchart will be described according to Step S.

Step S1: Read the tapping pitch display 321 and the number-of-revolutions display 322 from the memory to display them in the display section 32 on the screen of MDI/CRT 21 so that the tapping pitch P and the number of rotations S can be validated or selected.

Step S2: Then, select the values of the tapping pitch display 321 and of the number-of-revolutions display 322 by shifting the rectangle by the cursor 311 in the input section 31.

Step S3: If the number of revolutions S selected by the step S2 is to be changed, the procedure advances to the step S4 described below. If it is not to be changed, the procedure advances to the step S5 described below.

Step S4: Change the number of revolutions S by the spindle overload button 312 of FIG. 3. The changing of the number of revolutions S can be confirmed by lighting the spindle overload button 312 or other display section (not shown) or by displaying the number of revolutions in the number-of-revolution display section. The number of revolutions and tapping pitch in the rigid-type tapping operation of the machine tool according to said Step S1 through Step S4.

Step S5: Discriminate whether or not the rigid mode operation should be performed, based on the thus set number of revolutions and tapping pitch.

Step S6: In the step S5, if the machine tool is not set to the rigid mode, change the operating mode of the machine tool into the rigid mode by depressing the rigid tapping button 314 of the input section 31.

Step S7: Then, depressing the axial feed buttons 313 of the input section 31 to perform the rigid tapping operation, i.e. thread cutting. At that time, if the +Z button of the axial feed buttons 313 is depressed, the spindle and thus the tap 1 are moved in the direction of the work 7 at the feed speed, which is calculated based on the number of revolutions and the tapping pitch, while rotating at the preset number of rotations, to cut a thread. To the contrary, if the −Z button is depressed after the cutting has reached at the bottom of the thread, the spindle and thus the tap 1 is moved reversely away from the work 7 at the feed speed, which is calculated based on the number of revolution and the tapping pitch, while rotating reversely at the number of revolutions.

With this machine tool, it is possible to perform the tapping operation without using a tapping program, automatically obtaining the feed speed from the preset tapping pitch and the changed the number of revolutions and moving the spindle axially at the obtained feed speed.

Figure 5:
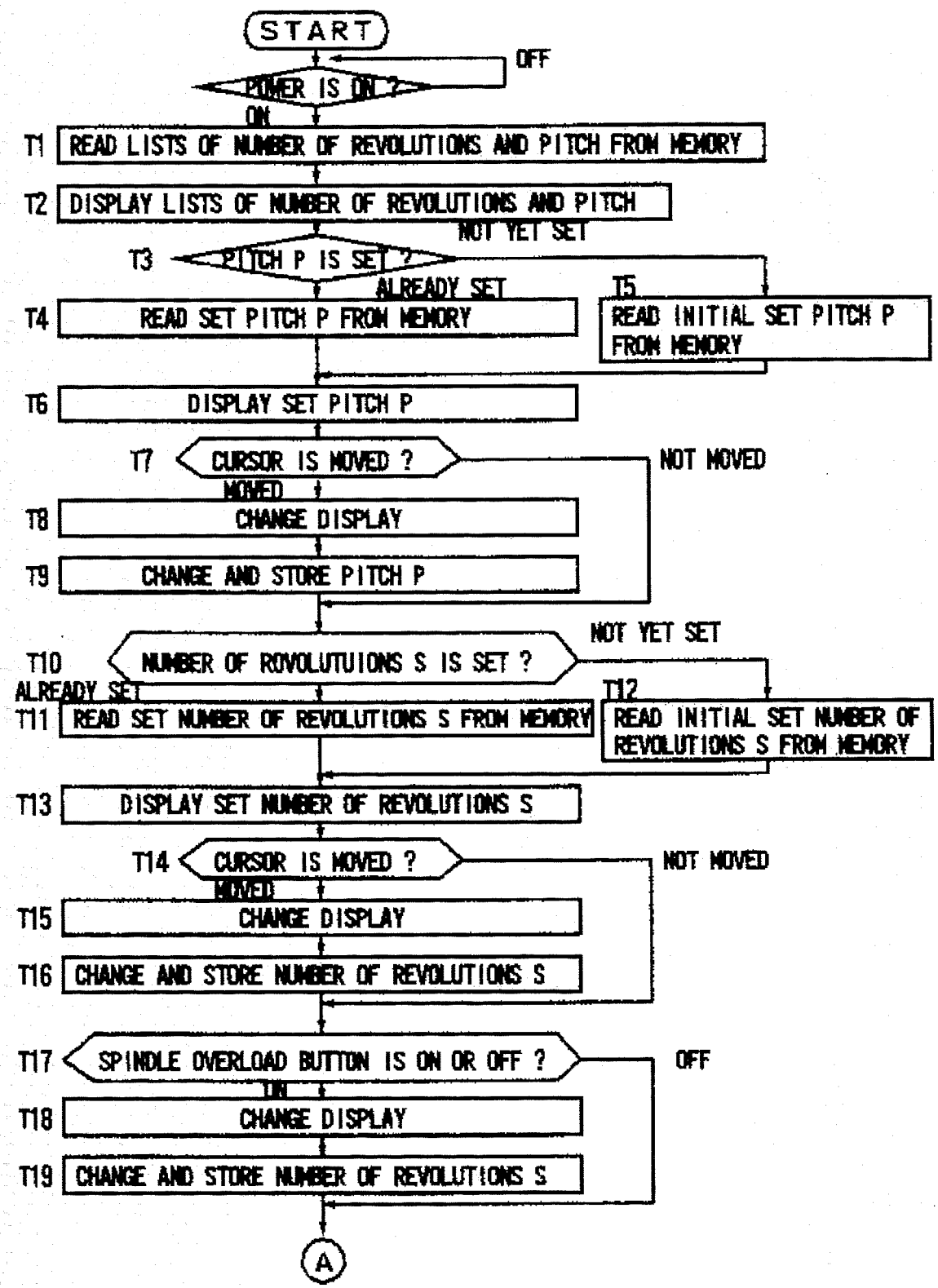
FIGS. 5 and 6 are flowcharts of the tapping function of the machine tool of the invention.
Figure 6:
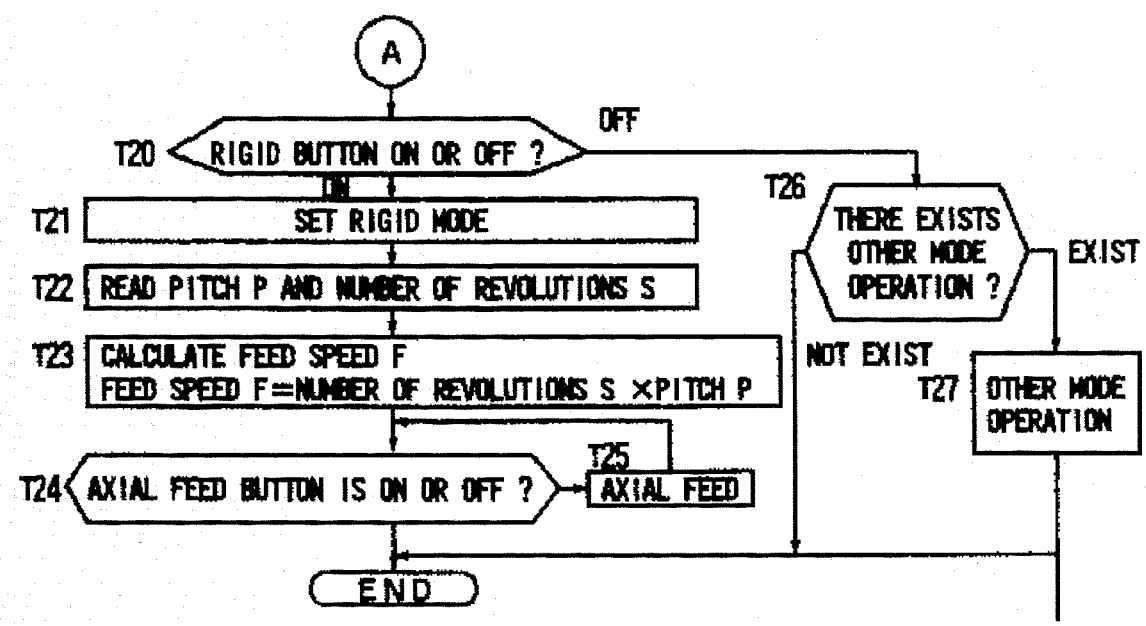

The operation of CPU will now be described using FIGS. 5 and 6. The flowchart will be described according to Step T.

Steps T1 and T2: When the power is turned on, the CPU 11 reads from the ROM 12 lists of the tap pitch display 321 and of the number-of-revolutions display 322 to display them in the display section 32 of the display screen 30 on the MDI/CRT 21.

Step T3: Discriminate whether or not the pitch P is set. If the pitch P is already set, the procedure advances to the step T6 described below. If the pitch P is not yet set, the procedure advances to the step T5.

Step T4: If the pitch P is already set, read the pitch P previously stored in the ROM 12.

Step T5: If the pitch P is not yet set, it is not able to display to pitch in the tap pitch display 321, so that the initial pitch P is read out from the memory such as ROM 12.

Step T6: The CPU 11 displays the preset pitch P by the rectangle on the tapping pitch display 321, based on the pitch read from the RAM 13 or the ROM 12 in the step T4 or T5.

Step T7: Discriminate whether or not the cursor 311 is moved. If the cursor 311 is moved, the procedure advances to the next step T8 as judged that the pitch is selected on the tapping pitch display 321. If the cursor 311 is not moved, the procedure advances to the step T10 as judged that the pitch is not changed on the tapping pitch display 321.

Step T8: Change the position of the rectangle on the tapping pitch display 321 in accordance with the movement of the cursor 311.

Step T9: Change the tapping pitch display 321 to the selected pitch P in accordance with the movement of the cursor 311 and store in the RAM 13 the newly selected pitch P as substitute for the previous value.

Step T10: Discriminate whether or not the number of revolutions S is set. If the number of revolutions S is already set, the procedure advances to the step T11. If the number of revolutions S is not yet set, the procedure advances to the step T12.

Step T11: If the number of revolutions is already set, read the number of revolutions S stored in the RAM 13.

Step T12: If the number of revolutions is not yet set, read the initially set number of revolutions S stored in the ROM 12, since the number of revolutions being set on the number-of-revolutions display 322.

Step T13: The CPU 11 displays the number of revolutions S by the rectangle on the number-of-revolutions 322, based on the number of revolutions S read from the RAM 13 or the ROM 12 in the step T11 or T12.

Step T14: Discriminate whether or not the cursor 311 is moved. If the cursor 311 is moved, the procedure advances to the next step T15 as judged that the number of revolutions is selected on the number-of-revolutions display 322. If the cursor 311 is not moved, the procedure advances to the step T17 as judged that the number of revolutions selected on the number-of-revolutions display 322 is not changed.

Step T15: Change the position of the rectangle on the number-of-revolutions display 322 in accordance with the movement of the cursor 311.

Step T16: Change the selected number of revolutions S in accordance with the movement of the cursor 311 and store in the RAM 13 the newly selected number of revolutions S as substitute for the previous value.

Step T17: Discriminate whether the spindle overload button 312 in the input section 31 is switched on or off.

Step T18: If the spindle overload button 312 is switched on as the result of judgment in step T17, change the number of revolutions S in the number-of-revolutions display section (not shown) in response to the selection of the up button or the down button.

Step T19: Store in the RAM 13 the changed number of revolutions S as substitute for the previous value.

By the foregoing steps, the setting up of the conditions for rigid tapping is completed.

Step T20: Then, judge the status of the rigid button 314 to discriminate whether or not the rigid mode operation should be performed.

Step T21: If the rigid button 314 is switched on, the NC machine tool is set up for the rigid mode operation. This setting-up is identical with that using an ordinary program, so its description is omitted here.

Step T22: Then, the CPU 11 reads from the RAM 13 the number of revolutions S and the pitch P.

Step T23: The CPU 11 obtains the feed speed F from the read number of revolutions S and pitch P by calculating the integration of the number of revolutions S and the pitch P and sends the obtained value with the number of revolutions S to the NC control device of the NC machine tool. If the CPU 11 also serves as this NC control device, the obtained feed speed F and the number of revolutions S are used.

Step T24: Discriminate whether the axial feed button of the input section 31 is switched on or off. If the axial feed button is switched on, the procedure advances to the next step T25. If the axial feed button is switched off, the tapping operation terminates.

Step T25: If the axial feed button is switched on, the direction of the axial feed is judged to perform the axial feed in that direction. The NC control device of the NC machine tool or the CPU 11 also serving as the NC control device drive the spindle control section 26 at the feed speed F and the number of revolutions S to drive the spindle motor 27 and the servo motor 28, thus performing this axial feed.

Steps T26 and T27: In the step T20, if the rigid button 314 is switched off, discriminate whether or not another mode operation should take place. If another mode operation should take place, then it is performed. If the mode operation should not take place, it terminates.

In the control of the rigid mode of the NC machine tool, it is possible to drive the spindle by setting up the operating conditions, such as the number of revolutions and the feed speed, based on set-up values from the input section and values obtained from the set-up values, without creating a program.

Even if the number of revolutions has been changed, it is possible to obtain and set the feed speed of the spindle automatically.

In the foregoing embodiment, it is possible to indicate candidates for selection of the number of revolutions and the tapping pitch and to select a desired value from the candidates by the cursor. Further, regarding the number of revolutions, it is possible to change the previously stored candidate value by the spindle overload buttons.

As is understood from the foregoing description, according to this invention, it is possible to provide a machine tool having a rigid-type tapping function which does not require any operation program for tapping. It is also possible to provide a machine tool having a rigid-type tapping function for which it is unnecessary to set the feed speed due to the change of the cutting conditions.

What is claimed is:

1. A machine tool equipped with a numerical control unit for digitally controlling a motor for a spindle, comprising:
   (a) input means for designating a revolving speed and a tapping pitch for the spindle;
   (b) arithmetic means for calculating a feed speed of the spindle based on said designated revolving speed and tapping pitch; and
   (c) said numerical control unit being operable to perform a tapping operation by controlling the rotating speed of the motor based on said designated revolving speed and also by controlling the axial movement of the spindle based on said designated tapping pitch.

2. A machine tool equipped with a numerical control unit for digitally controlling a motor for a spindle, comprising:
   (a) input means for designating a tapping pitch for the spindle;
   (b) revolving speed changing means for changing a revolving speed for the spindle;
   (c) arithmetic means for calculating a feed speed of the spindle based on said designated tapping pitch and said changed revolving speed; and
   (d) said numerical control unit being operable to perform a tapping operation by controlling the rotating speed of the motor based on said changed revolving speed and also by controlling the axial movement of the spindle based on said calculated feed speed.

* * * * *